(12) United States Patent
Hasegawa et al.

(10) Patent No.: US 9,846,321 B2
(45) Date of Patent: Dec. 19, 2017

(54) VOLTAGE ADJUSTMENT CIRCUIT AND DISPLAY DEVICE DRIVING CIRCUIT

(71) Applicant: Cypress Semiconductor Corporation, San Jose, CA (US)

(72) Inventors: Katashi Hasegawa, Kasugai (JP); Masaya Mizutani, Kasugai (JP)

(73) Assignee: Cypress Semiconductor Corporation, San Jose, CA (US)

( * ) Notice: Subject to any disclaimer, the term of this patent is extended or adjusted under 35 U.S.C. 154(b) by 87 days.

(21) Appl. No.: 14/089,048

(22) Filed: Nov. 25, 2013

(65) Prior Publication Data

US 2014/0085555 A1    Mar. 27, 2014

Related U.S. Application Data

(62) Division of application No. 12/794,158, filed on Jun. 4, 2010, now Pat. No. 8,593,447.

(30) Foreign Application Priority Data

Jun. 5, 2009  (JP) ................ 2009-136201

(51) Int. Cl.
  *G09G 3/36* (2006.01)
  *G02F 1/133* (2006.01)

(52) U.S. Cl.
  CPC ....... *G02F 1/13306* (2013.01); *G09G 3/3696* (2013.01); *G09G 3/3648* (2013.01); *G09G 2320/0219* (2013.01)

(58) Field of Classification Search
  CPC ...... G09G 3/36; G09G 3/3677; G09G 3/3696; G09G 3/3648; G09G 2320/0219; G02F 1/13306

USPC ..... 345/87–100, 211–213, 690, 204; 349/33; 330/255, 296; 327/318

See application file for complete search history.

(56) References Cited

U.S. PATENT DOCUMENTS

| 5,804,997 A | * | 9/1998 | Nishizono | ............... H03F 3/087 327/103 |
| 8,593,447 B2 | | 11/2013 | Hasegawa et al. | |
| 2001/0028273 A1 | * | 10/2001 | Minamizaki | ......... G09G 3/3688 330/255 |
| 2003/0122765 A1 | | 7/2003 | Yoon | |
| 2004/0246219 A1 | | 12/2004 | Moon | |

(Continued)

FOREIGN PATENT DOCUMENTS

| GB | 2 341 714 | 3/2000 |
| JP | 2000-137247 | 5/2000 |

(Continued)

OTHER PUBLICATIONS

Office Action issued in Japanese Patent Application No. JP-2009-136201, dated Oct. 16, 2002, 7 pages.

(Continued)

*Primary Examiner* — Nalini Mummalaneni
*Assistant Examiner* — James Nokham

(57) ABSTRACT

A voltage adjustment circuit for adjusting a voltage to be supplied to scanning lines of a display device includes a slope adjustment circuit configured to adjust a slope of a decrease in the voltage based on data that is externally input, and a clamp voltage adjustment circuit configured to adjust a voltage value at which the voltage is clamped based on the data.

6 Claims, 13 Drawing Sheets

(56) References Cited

U.S. PATENT DOCUMENTS

| | | | | |
|---|---|---|---|---|
| 2004/0246245 A1* | 12/2004 | Yanagi | ............... | G09G 3/3648 |
| | | | | 345/204 |
| 2005/0062706 A1 | 3/2005 | Mizumaki | | |
| 2006/0071896 A1 | 4/2006 | Nakata et al. | | |
| 2006/0092109 A1 | 5/2006 | Hsu et al. | | |
| 2008/0278431 A1 | 11/2008 | Feng | | |
| 2008/0316161 A1* | 12/2008 | Song | .................... | G09G 3/3614 |
| | | | | 345/95 |
| 2009/0189883 A1* | 7/2009 | Chung | ................. | G09G 3/3674 |
| | | | | 345/213 |
| 2009/0244109 A1* | 10/2009 | Chen | .................... | G09G 3/3648 |
| | | | | 345/690 |
| 2009/0261753 A1* | 10/2009 | Kishioka | ............... | H02M 3/07 |
| | | | | 315/294 |
| 2009/0295486 A1* | 12/2009 | Lee | ...................... | G09G 3/3688 |
| | | | | 330/296 |
| 2010/0309190 A1 | 12/2010 | Hasegawa et al. | | |

FOREIGN PATENT DOCUMENTS

| | | |
|---|---|---|
| JP | 2001-125069 | 5/2001 |
| JP | 2004-110036 | 4/2004 |
| JP | 2006-126781 | 5/2006 |
| JP | 2006-330404 | 12/2006 |
| JP | 2008-145677 | 6/2008 |

OTHER PUBLICATIONS

USPTO Non-Final Rejection for U.S. Appl. No. 12/794,158 dated Apr. 3, 2013; 12 pages.

USPTO Notice of Allowance for U.S. Appl. No. 12/794,158 dated Jul. 19, 2013; 8 pages.

* cited by examiner

VOLTAGE ADJUSTMENT CIRCUIT AND DISPLAY DEVICE DRIVING CIRCUIT

CROSS-REFERENCE TO RELATED APPLICATION

This application is a divisional application of co-pending U.S. patent application Ser. No. 12/794,158, which was filed on Jun. 4, 2010, and is based upon and claims the benefit of priority of the prior Japanese Patent Application No. 2009-136201, filed on Jun. 5, 2009, the entire contents of which are both incorporated herein by reference.

FIELD

The embodiments discussed herein relate to a voltage adjustment circuit for adjusting a voltage supplied to scanning lines of a display device.

BACKGROUND

A display device (liquid crystal panel, etc.) charges the capacitor of a pixel circuit selected using scanning lines and input signal lines with a signal voltage supplied from a source driver via an input signal line, so that the necessary colors and brightnesses are represented by each pixel.

For example, when a high-potential-side voltage $V_{GH}$ of 30V is supplied to a scanning line in each pixel circuit, the TFT transistor of each pixel circuit is turned on, and a charging operation is performed in which the capacitor of each pixel circuit is charged up to a signal voltage supplied to the input signal line. A further example is when a low-potential-side voltage $V_{GL}$ of −5V is supplied to the scanning line, the TFT transistor is turned off, and a holding operation in which the charged voltage of the capacitor is held is performed. The charging operation and a holding operation are alternately repeated.

In the liquid crystal panel, flicker and color variations occur depending on the position of a panel. The flicker and color variations occur as a result of the slope of the decrease in scanning line potential becoming shallower with increasing distance from a gate driver due to a parasitic capacitance between the scanning line and a panel substrate, and because the slope of the decrease in scanning line potential differs depending on the panel position, a feed-through voltage in a TFT transistor of each pixel circuit in the same scanning line varies.

The feed-through voltage is a difference between the charged voltage of a capacitor during the charging operation of the pixel circuit and the charged voltage of the capacitor during the holding operation. The steeper the slope of the decrease in scanning line potential, the more the voltage of the capacitor during the holding operation is decreased due to the influence of the parasitic capacitance, and the feed-through voltage increases.

Accordingly, a driving unit of a liquid crystal panel, which is provided with a voltage adjustment circuit (gate voltage shaping circuit) that causes the slope of the decrease in scanning line potential to become shallow in order to ensure that the driving unit is not easily affected by parasitic capacitance, has been proposed.

FIG. 1 illustrates an example of the related art of a voltage adjustment circuit that adjusts a power-supply voltage supplied to a gate driver for driving the scanning lines of a liquid crystal panel in order to reduce the decrease in scanning line potential.

This voltage adjustment circuit includes a delay setting circuit 1, a slope adjustment circuit 2, and a clamp voltage adjustment circuit 3, and a control logic 4 of the delay setting circuit 1 performs opening/closing control of switch circuits 5a to 5c based on a control signal CTL.

When the control signal CTL reaches a high level (hereinafter referred to as H level), the switch circuit 5a is turned on. As illustrated in FIG. 3, for example, an output voltage $V_{GHM}$ that has a similar potential as the high-potential-side power supply voltage $V_{GH}$ of 30V is output to the gate driver as a power supply, and the capacitor CL is charged up to the voltage $V_{GH}$ level.

When the control signal CTL reaches a low level (hereinafter referred to as L level), the switch circuit 5a is turned off, and the switch circuit 5b is turned on. The output voltage $V_{GHM}$ starts to fall after a delay time period t1 set by the capacitor CE of the delay setting circuit 1 starting from the decrease in the level of the control signal CTL. Then, the output voltage $V_{GHM}$ decreases at a rate adjusted by the capacitor CL and the resistor RE of the slope adjustment circuit 2.

When the output voltage $V_{GHM}$ decreases to a clamp voltage $V_{CLP}$ set by the clamp voltage adjustment circuit 3, the clamp voltage $V_{CLP}$ is maintained and increases up to the voltage $V_{GH}$ again at the next rise of the control signal CTL, and the above-described operations are repeated.

The above-described output voltage $V_{GHM}$ of the voltage adjustment circuit is supplied as a power supply to the gate driver, and the gate driver controls the scanning lines based on a scanning line driving voltage GVS. Due to the voltage adjustment circuit operations, the rate of decrease in the scanning line driving voltage GVS decreases, and variations in the feed-through voltage of each pixel circuit in the same scanning line are suppressed.

Furthermore, a display device has been proposed in which, by controlling the rate of decrease in scanning line driving voltage, it is possible to avoid the flicker that occurs in the vertical direction of a liquid crystal panel (see Japanese Laid-open Patent Publication No. 2008-145677).

The voltage adjustment circuit is configured in such a manner that the capacitor CL is charged/discharged by the slope adjustment circuit 2 in order to generate an output voltage $V_{GHM}$, and the gate driver is driven using the output voltage $V_{GHM}$. Thus, a capacitor CL that has a large capacitance is necessary.

Furthermore, the delay setting circuit 1 is configured in such a manner that a capacitor CE formed as an externally provided element is used in order to adjust the delay time period t1 of the decrease in output voltage $V_{GHM}$. The slope adjustment circuit 2 is configured in such a manner that a resistor RE formed as an externally provided element is used in order to adjust the rate of decrease in output voltage $V_{GHM}$. Then, the capacitor CE is used to adjust a delay time period t1 for increasing a scanning line driving voltage GVS up to a high-potential-side voltage $V_{GH}$. The resistor RE is used to adjust the slope of the decrease in output voltage $V_{GHM}$ in order to eliminate flicker and color variations.

Therefore, since the resistor RE of the externally provided element is necessary, problems arise in that the voltage adjustment circuit becomes large, and also, the cost increases. Furthermore, in a case where the slope of the decrease in output voltage $V_{GHM}$ is to be re-adjusted, some problems are that replacement of the resistor RE is necessary and also, only uniform adjustment may be performed for each scanning line.

SUMMARY

According to an aspect of the embodiments, a voltage adjustment circuit for adjusting a voltage to be supplied to scanning lines of a display device, the voltage adjustment circuit includes a slope adjustment circuit configured to adjust a slope of a decrease in the voltage based on data that is externally input, and a clamp voltage adjustment circuit configured to adjust a voltage value at which the voltage is clamped based on the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS/FIGURES

DESCRIPTION OF THE EMBODIMENTS

A first embodiment is described with reference to the drawings.

Figure 1:
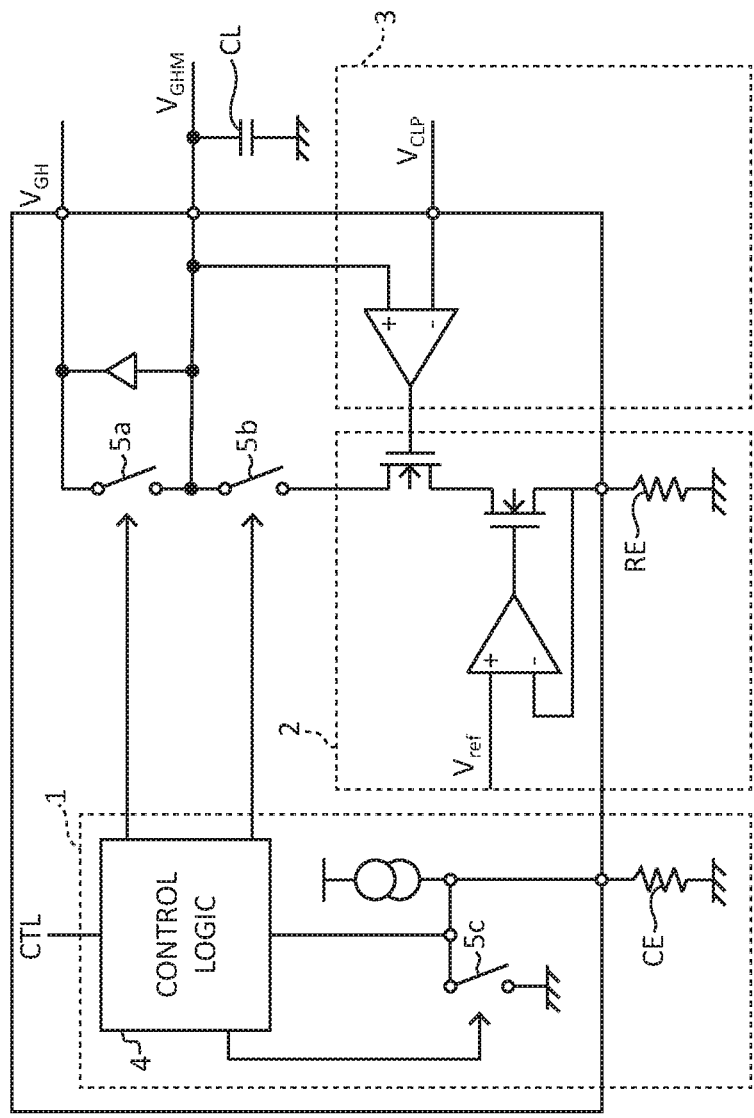
FIG. 1 illustrates a voltage adjustment circuit of the related art.
Figure 2:
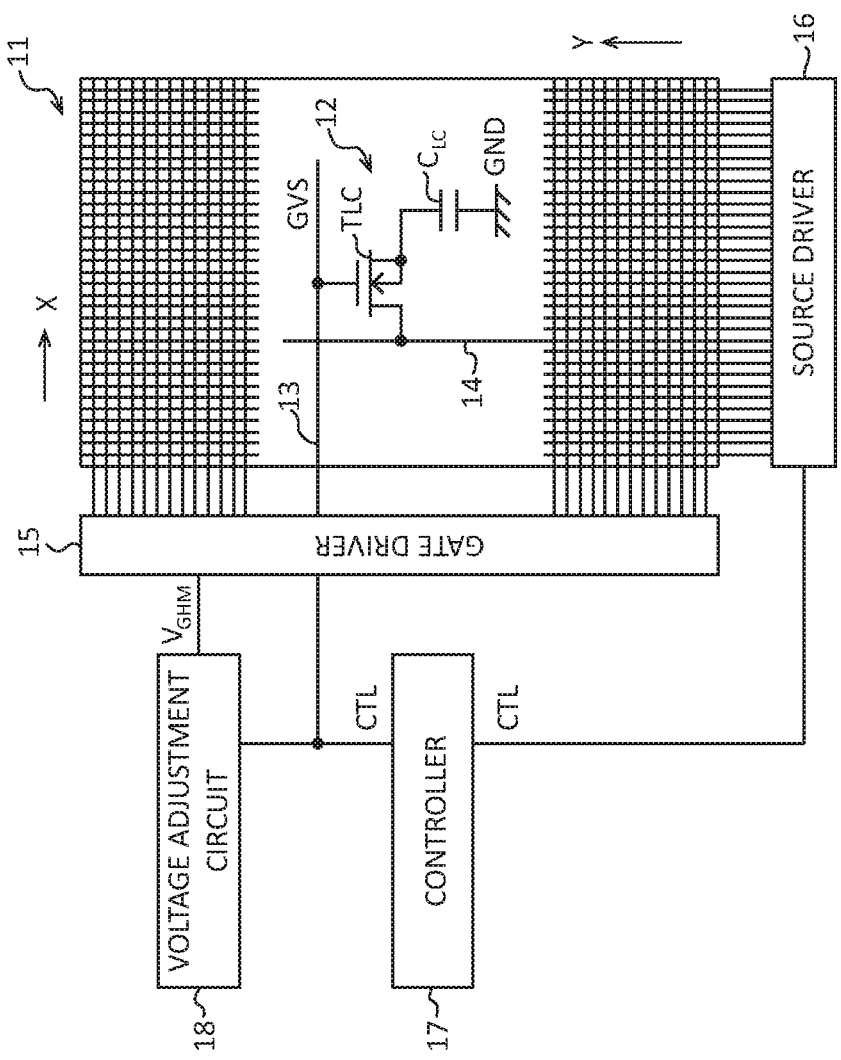
FIG. 2 illustrates a driving device of a liquid crystal panel according to embodiments.

FIG. 2 illustrates a driving device of a liquid crystal panel. A plurality of pixel circuits 12 of a liquid crystal panel 11 are arranged in the X-Y direction. Each of the pixel circuits 12 include a TFT transistor $T_{LC}$ and a capacitor $C_{LC}$.

A common scanning line 13 is coupled to the gate of the TFT transistor $T_{LC}$ of the pixel circuit 12 arranged in the X direction. A common input signal line 14 is coupled to the drain of the TFT transistor $T_{LC}$ of the pixel circuit 12 arranged in the Y direction. Then, the capacitor $C_{LC}$ is coupled between the source of the TFT transistor $T_{LC}$ and the ground GND.

Figure 3:
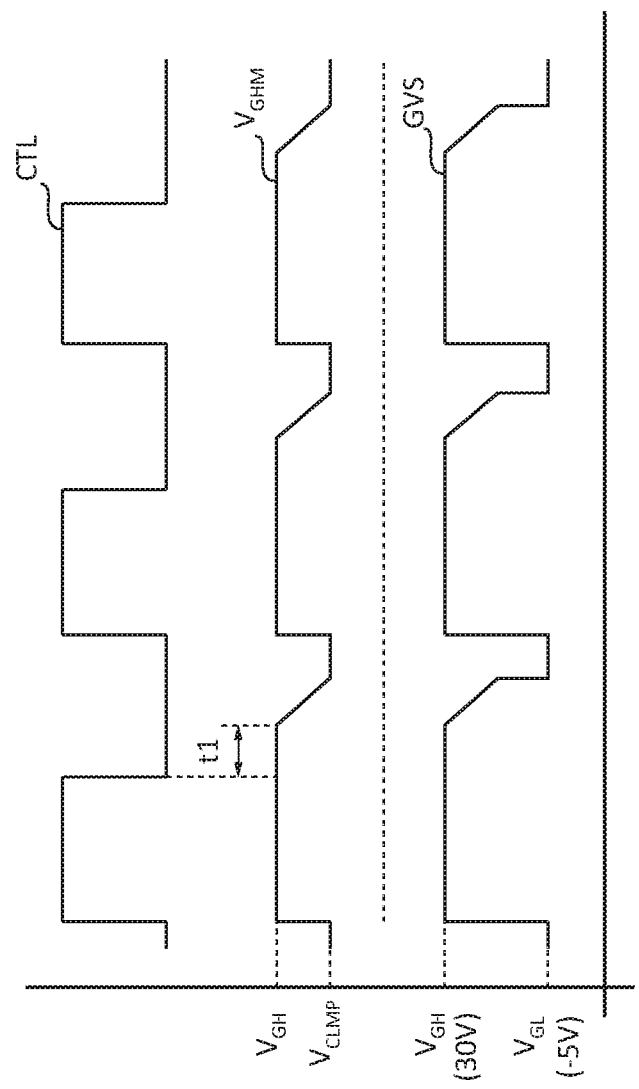
FIG. 3 illustrates a waveform illustrating an output signal of the voltage adjustment circuit of FIG. 2.

A scanning line driving voltage GVS illustrated in FIG. 3 is supplied from a gate driver 15 to the scanning line 13. For the scanning line driving voltage GVS, for example, a voltage of 30V is supplied as a high-potential-side voltage $V_{GH}$, and a voltage of −5V is supplied as a low-potential-side voltage $V_{GL}$.

When the high-potential-side voltage $V_{GH}$ is supplied to the scanning line 13 (illustrated in FIG. 2), a TFT transistor $T_{LC}$ is turned on, and a signal voltage supplied to the drain of the TFT transistor $T_{LC}$ via an input signal line 14, which is input from a source driver 16, is charged in the capacitor $C_{LC}$. Furthermore, when the low-potential-side voltage $V_{GL}$ (illustrated in FIG. 3) is supplied to the scanning line 13, the TFT transistor $T_{LC}$ is turned off, and the charged voltage of the capacitor $C_{LC}$ is maintained.

The gate driver 15 and the source driver 16 are controlled in synchronization with a control signal CTL output from a controller 17. Furthermore, the control signal CTL is input to a voltage adjustment circuit 18. The voltage adjustment circuit 18 supplies the output voltage $V_{GHM}$ to the gate driver 15.

As illustrated in FIG. 3, for an output voltage $V_{GHM}$ of the voltage adjustment circuit 18, the high-potential-side voltage $V_{GH}$ is output in response to the rise of the control signal CTL. Furthermore, the high-potential-side voltage $V_{GH}$ drops to the clamp voltage $V_{CLP}$ (not illustrated) at a preset slope from the decrease in the control signal CTL after a preset delay time period t1, and the operation is repeated.

The gate driver 15 outputs a scanning line driving voltage GVS illustrated in FIG. 3 based on the output voltage $V_{GHM}$ of the voltage adjustment circuit 18 (illustrated in FIG. 2).

Figure 4:
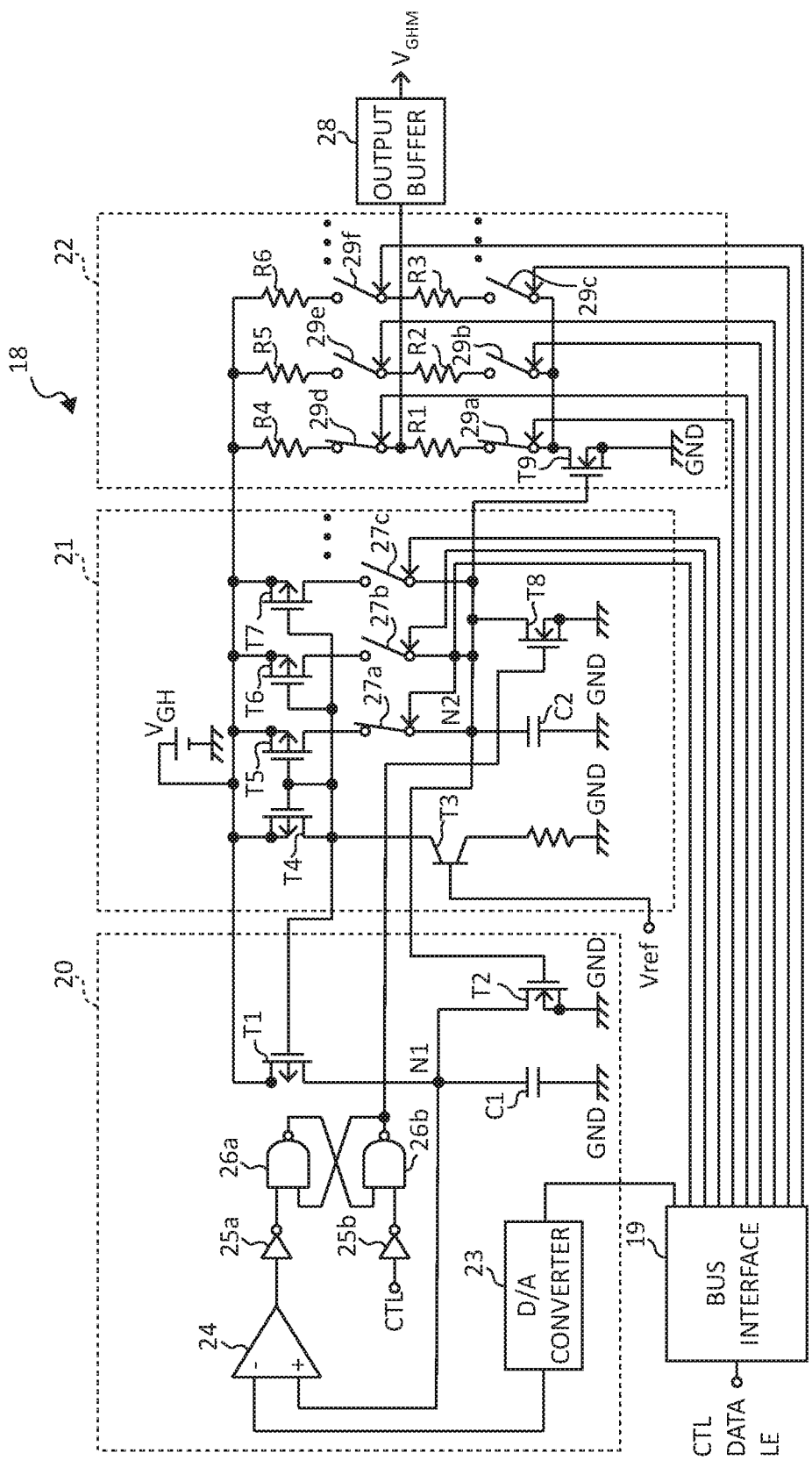
FIG. 4 illustrates a first embodiment of the voltage adjustment circuit of FIG. 2.

Next, a description is given, with reference to FIG. 4, of the specific configuration of the voltage adjustment circuit 18. The voltage adjustment circuit 18 includes a bus interface 19, a delay setting circuit 20, a slope adjustment circuit 21, a clamp voltage adjustment circuit 22, and an output buffer 28.

The control signal CTL, data DATA, and a signal LE for integrating the data DATA are input to the bus interface 19. The data DATA is input in such a manner as for each item of data for setting the delay time period t1 of the output voltage $V_{GHM}$, the slope of the fall, and the clamp voltage $V_{CLP}$ to be in the form of a digital signal of multiple bits.

Next, the delay setting circuit 20 is described. The data DATA for setting the delay time period t1 is converted into an analog voltage by a D/A converter 23 and is input to the minus-side input terminal of a comparator 24.

The plus-side input terminal of the comparator 24 is coupled to a node N1 that is a high-potential-side terminal of the capacitor C1, and the charged voltage of the capacitor C1 is input to the plus-side input terminal. Then, the comparator 24 compares the output voltage of the D/A converter 23 with the charged voltage of a capacitor C1. When the charged voltage of the capacitor C1 becomes higher than the output voltage of the D/A converter 23, the comparator 24 outputs an output signal of an H level and outputs an output signal of an L level in other cases.

The output signal of the comparator 24 and the control signal CTL are input to a logic circuit that triggers the start of the decrease in the output signal $V_{GHM}$. That is, the output signal of the comparator 24 is input to an inverter circuit 25a, and the output signal of the inverter circuit 25a is input to a NAND circuit 26a. Furthermore, the control signal CTL is input to an inverter circuit 25b, and the output signal of the inverter circuit 25b is input to a NAND circuit 26b. Then, the output signal of the NAND circuit 26a is input to the NAND circuit 26b, and the output signal of the NAND circuit 26b is input to the NAND circuit 26a.

With the configuration illustrated in FIG. 4, when the output signal of the comparator 24 is at an H level, the output signal of the NAND circuit 26a shifts to an H level. When the output signal of the comparator 24 is at an L level, the NAND circuit 26a outputs an inversion signal of the output signal of the NAND circuit 26b.

Furthermore, when the control signal CTL shifts to an H level, the output signal of the NAND circuit 26b shifts to an L level. When the control signal CTL shifts to an L level for the output signal of the NAND circuit 26b, an inversion signal of the output signal of the NAND circuit 26a is output.

Therefore, when the control signal CTL shifts to an H level, the output signal of the NAND circuit 26b shifts to an H level. After the control signal CTL shifts to an L level, when the output signal of the NAND circuit 26a shifts to an H level, the output signal of the NAND circuit 26b shifts to an L level (trigger).

The drain of a P-channel MOS transistor T1 is coupled to the node N1, and the power supply $V_{GH}$ is coupled to the source of the transistor T1. Therefore, when the transistor T1 is turned on, the capacitor C1 is charged with constant current supplied from the transistor T1.

Furthermore, an N-channel MOS transistor T2 is coupled between the node N1 and the ground GND. The current driving performance of the transistor T2 is set to be sufficiently larger than that of the transistor T1. Therefore, when the transistor T2 is turned on, the charging electric charge of the capacitor C1 is discharged, and the potential of the node N1 is decreased to be near the ground GND level.

Next, the slope adjustment circuit 21 is described. A reference voltage Vref is input to the gate of an NPN transistor T3, and certain collector current flows through the transistor T3. The reference voltage Vref is supplied from the outside. Furthermore, the reference voltage Vref may be generated inside the voltage adjustment circuit 18.

The emitter of the transistor T3 is coupled to the ground GND via a resistor, the collector thereof is coupled to the drain and the gate of the P-channel MOS transistor T4, and the source of the transistor T4 is coupled to the power supply $V_{GH}$.

Furthermore, the gate of the transistor T4 is coupled to the gates of the P-channel MOS transistors (charging current adjustment circuit) T5 to T7, and the source of each of the transistors T5 to T7 is coupled to the power supply $V_{GH}$. Therefore, the transistors T5 to T7 perform a current mirror operation with respect to the transistor T4. The ON resistance value of each of the transistors T5 to T7 is set in order to be sufficiently higher than the ON resistance value of a transistor T8. Furthermore, the gate of the transistor T4 is coupled to the gate of the transistor T1.

The drains of the transistors T5 to T7 are coupled to the node N2 that is a high-potential-side terminal of a capacitor C2 via switch circuits 27a to 27c, respectively, and the other end of the capacitor C2 is coupled to the ground GND.

The opening/closing of the switch circuits 27a to 27c is controlled based on the control signal supplied from the bus interface 19, and a control signal thereof is generated based on the data DATA.

Therefore, with the opening/closing control of the switch circuits 27a to 27c, it may be possible to adjust the charging rate of the capacitor C2, that is, the rate of increase in the voltage of the node N2. Furthermore, if the number of transistors and resistors that are coupled in parallel to the transistor T5 and the switch circuit 27a is further increased, and the current driving performance of each transistor is set to low, it may be possible to adjust the rate of increase in the voltage of the node N2 more finely.

The drain of the N-channel MOS transistor T8 is coupled to the node N2, and the source of the transistor T8 is coupled to the ground GND. Furthermore, the output signal of the NAND circuit 26b is input to the gate of the transistor T8.

Therefore, when the output signal of the NAND circuit 26b shifts to an H level, the transistor T8 is turned on, and the capacitor C2 is discharged.

Furthermore, the node N2 is coupled to the gate of the transistor T2. When the potential of the node N2 is increased, the transistor T2 is turned on, and the capacitor C1 is discharged, thereby causing the potential of the node N1 to be decreased.

Next, a clamp voltage adjustment circuit 22 is described. The node N2 is coupled to the gate of an N-channel MOS transistor (output circuit) T9, and the source of the transistor T9 is coupled to the ground GND. When the potential of the node N2 is increased, the transistor T9 is turned on.

The drain of the transistor T9 is coupled to the input terminal of an output buffer 28 via a switch circuit 29a and a resistor R1. Furthermore, a switch circuit 29b and a resistor R2, and a switch circuit 29c and a resistor R3 are coupled in parallel to the switch circuit 29a and the resistor R1.

The input terminal of the output buffer 28 is coupled to the power supply $V_{GH}$ via a switch circuit 29d and a resistor R4. A switch circuit 29e and a resistor R5, and a switch circuit 29f and a resistor R6 are coupled in parallel to the switch circuit 29d and the resistor R4. The resistors R1 to R6 are set to have a similar resistance.

The opening/closing of the switch circuits 29a to 29f is controlled based on the control signal supplied from the bus interface 19, and the control signal is generated based on the data DATA.

Therefore, when the combined resistance between the power supply $V_{GH}$ and the transistor T9 is adjusted (resistance adjustment circuit) with the opening/closing control of the switch circuits 29a to 29f, and the transistor T9 is turned on, the input voltage of the output buffer 28 is clamped based on the combined resistance of the resistors R1 to R6 that are selected by the opening/closing control of the switch circuits 29a to 29f.

In a state in which the transistor T9 is turned off, the input voltage of the output buffer 28 shifts to the power supply $V_{GH}$ level.

Furthermore, if the resistors are coupled in parallel to the resistor R1 and the resistor R4, it may be possible to adjust the clamp voltage more finely.

The output buffer 28 buffers the input voltage, and outputs the input voltage as an output voltage $V_{GHM}$ to the gate driver 15.

Next, the operation of the voltage adjustment circuit 18 that is configured as described above is described. Based on a control signal output from the bus interface 19 based on the data DATA, at least one of the switch circuits 27a to 27c of the slope adjustment circuit 21 enters a conductive state, and at least one of the switch circuits 29a to 29c of the clamp voltage adjustment circuit 22, and at least one of the switch circuits 29d to 29f enter a conductive state.

Furthermore, based on a reference voltage Vref, the transistor T3 is turned on, and the transistors T1 and T4 to T7 are turned on.

In this state, when the control signal CTL at an H level is input to the delay setting circuit 20, the output signal of the inverter circuit 25b shifts to an L level, thereby causing the output signal of the NAND circuit 26b to shift to an H level.

Figure 5:
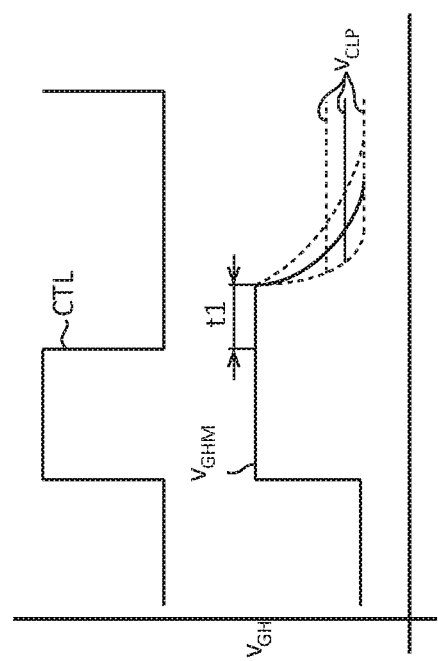
FIG. 5 illustrates a waveform illustrating an output signal of the voltage adjustment circuit of FIG. 4.

Then, the transistor T8 of the slope adjustment circuit 21 is turned on, and the node N2 shifts to a nearly ground GND level, so that the transistor T9 of the clamp voltage adjustment circuit 22 and the transistor T2 of the delay setting circuit 20 are turned off. As a result, the output voltage $V_{GHM}$ shifts to the power supply $V_{GH}$ level as illustrated in FIG. 5.

When the control signal CTL decreases to an L level, the output signal of the inverter circuit 25b shifts to an H level, and the output signal of the NAND circuit 26b enters a state in which the inversion signal of the output signal of the NAND circuit 26a is output. Then, in a state in which the output signal of the comparator 24 is at an L level, since the output signal of the NAND circuit 26a is maintained at an L level, the output signal of the NAND circuit 26b is maintained at an H level.

In this state, the capacitor C1 is charged with the drain current of the transistor T1. As illustrated in FIG. 5, when the potential of the node N1 equals or becomes higher than the output voltage of the D/A converter 23 after a passage of a time period t1 starting from the decrease in the control signal CTL, the output signal of the comparator 24 shifts to an H level.

Then, the output signal of the NAND circuit 26a shifts to an H level, and the input signal of the NAND circuit 26b shifts to an H level, thereby causing the output signal of the NAND circuit 26b to become an L level.

When the output signal of the NAND circuit 26b shifts to an L level, the transistor T8 is turned off. Then, the capacitor C2 is charged with the drain current of at least one of the transistors T5 to T7, causing the potential of the node N2 to be increased.

When the potential of the node N2 is further increased and exceeds the threshold value of the transistor T9, the output voltage $V_{GHM}$ is decreased with a decrease in the drain current of the transistor T9, that is, a decrease in ON resistance. Then, when the transistor T9 enters a saturation state, the output voltage $V_{GHM}$ is converged to a clamp voltage $V_{CLP}$ that is set by the combined resistance of the resistors R1 to R6 that are selected by the switch circuits 29a to 29f.

Furthermore, when the transistor T2 is turned on with an increase in the potential of the node N2, the charging electric charge of the capacitor C1 is absorbed by the transistor T2, and the potential of the node N1 is decreased. Then, when the potential of the node N1 decreases to less than the output voltage of the D/A converter 23, the output signal of the comparator 24 shifts to an L level.

At this time, even if the output signal of the comparator 24 shifts to an L level, since the output signal of the NAND circuit 26b is at an L level, the output signal of the NAND circuit 26a is maintained at an H level.

Next, when the control signal CTL shifts to an H level, the output signal of the NAND circuit 26b shifts to an H level, causing the transistor T8 to be turned on and the transistors T9 and 12 to be turned off, and the above-described operation is repeated.

As described above, when the voltage adjustment circuit 18 adjusts the data DATA in order to adjust the output voltage of the D/A converter 23 of the delay setting circuit 20, it may be possible to adjust the timing at which the output signal of the comparator 24 is switched from the L level to the H level, that is, the timing at which the output signal of the NAND circuit 26b is shifted from the H level to the L level. Therefore, by adjusting the delay time period t1 illustrated in FIG. 5, it may be possible to make adjustments so that the scanning line driving voltage GVS is reliably increased up to the high-potential-side voltage VGH.

Furthermore, when the number of switch circuits that are to be placed in a conductive state by the switch circuits 27a to 27c of the slope adjustment circuit 21 in accordance with the data DATA, it may be possible to adjust the rate of increase of the potential of the node N2. As a result, by adjusting the rate of increase of the drain current of the transistor T9 of the clamp voltage adjustment circuit 22, it may be possible to adjust the slope of the decrease in the output voltage $V_{GHM}$.

Furthermore, when the switch circuits 29a to 29f of the clamp voltage adjustment circuit 22 are controlled in accordance with the data DATA, it may be possible to adjust the combined resistance value of the resistors R1 to R6. Then, the adjustment of the combined resistance value makes it possible to adjust the clamp voltage $V_{CLP}$ that is an potential of the lower limit of the output signal $V_{GHM}$.

Next, the relationship between the clamp voltage $V_{CLP}$ and the feed-through voltage is described.

Figure 6:
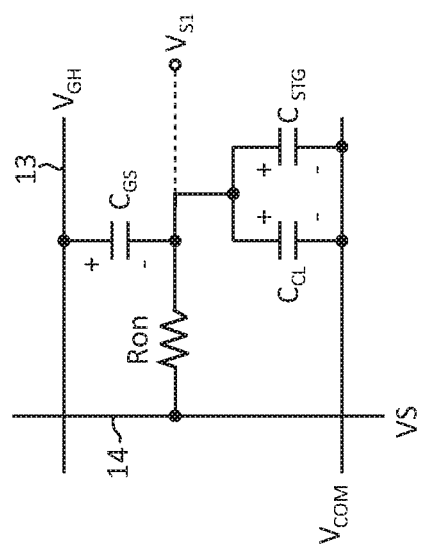
FIG. 6 illustrates an equivalent circuit of a pixel circuit during scanning line selection of FIG. 2.
Figure 7:
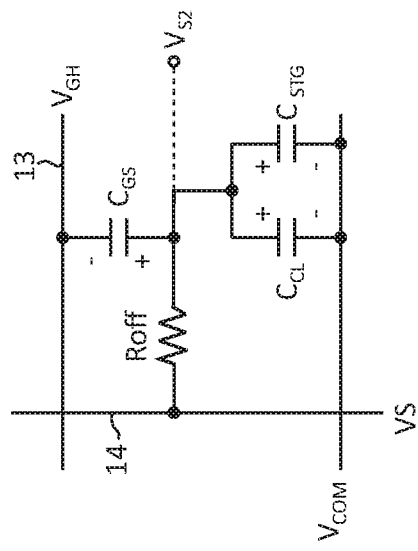
FIG. 7 illustrates an equivalent circuit of FIG. 2 of a pixel circuit during scanning line non-selection.

FIG. 6 illustrates an equivalent circuit at the time of an operation during a charging operation in the pixel circuit 12. FIG. 7 illustrates an equivalent circuit at the time of a holding operation in the pixel circuit 12.

At the time of a charging operation, a high-potential-side voltage $V_{GH}$ is supplied to the scanning line 13, and a signal voltage VS is supplied to the input signal line 14. Then, as illustrated in FIG. 6, the ON resistor $R_{on}$ causes the transistor $T_{LC}$ to be turned on, causing the capacitor $C_{LC}$ to be charged with the signal voltage VS.

At this time, a parasitic capacitance $C_{GS}$ occurs between the scanning line 13 and the capacitor $C_{LC}$, and a parasitic capacitance $C_{STG}$ occurs between the high-potential-side terminal of the capacitor $C_{LC}$ and a substrate potential $V_{COM}$.

Then, the charging electric charge Q1 of the capacitor $C_{LC}$ at the time of a writing operation is represented by Expression (1), and the capacitor $C_{LC}$ is charged up to a charged voltage VS1 that is nearly equal to the signal voltage VS.

$$Q1 = -CGS(VGH-VS)+(CLC+CSTG)(VS-VCOM) \quad (1)$$

On the other hand, as illustrated in FIG. 7, at the time of a holding operation, a low-potential-side voltage $V_{GL}$ is supplied to the scanning line 13, causing the transistor $T_{LC}$ to be turned off, with the result that the input signal line 14 and the high-potential-side terminal of the capacitor $C_{LC}$ are cut off from each other by a high resistance $R_{off}$.

Then, if the charged voltage of the capacitor $C_{LC}$ at the time of a holding operation is denoted as VS2, $V_{GL}$<VS2. Consequently, the charging electric charge Q2 of the capacitor $C_{LC}$ at the time of the holding operation is represented by Expression (2).

$$Q2 = CGS(VS2-VGL)+(CLC+CSTG)(VS2-VCOM) \quad (2)$$

Here, if the charging electric charges Q1 and Q2 of the capacitor $C_{LC}$ are equal to each other by the law of charge conservation, Expression (3) is obtained from the above expression by setting Q1=Q2.

$$VS2 = VS-(CGS/(CLC+CSTG+CGS))(VGH-VGL) \quad (3)$$

The feed-through voltage is a voltage change ΔVS from the charged voltage VS1 at the time of a writing operation to the charged voltage VS2 at the time of a holding operation, and is obtained by Expression (4).

$$VS = VS1-VS2 = (CGS/(CLC+CSTG+CGS))VGH-VGL) \quad (4)$$

With Expression (4), the lower the low-potential-side voltage $V_{GL}$, the larger the feed-through voltage becomes. In a similar manner, the lower the clamp voltage $V_{CLP}$ of the output voltage $V_{GHM}$ of the voltage adjustment circuit 18, the larger the feed-through voltage becomes.

In the voltage adjustment circuit configured in the manner described above, the operational effects described below may be obtained.

Based on the data DATA, it may be possible for the delay setting circuit 20 to adjust the delay time period t1 from the decrease in the control signal CTL to the decrease in the output signal $V_{GHM}$. Therefore, it may not be necessary to couple an externally provided capacitor in order to set the delay time period t1, and the adjustment of the delay time period t1 may be performed.

Based on the data DATA, it may be possible for the slope adjustment circuit 21 to adjust the slope of the decrease in the output signal $V_{GHM}$. Therefore, it may be possible to easily adjust the slope of the fall without coupling an externally provided resistor, and the adjustment of the feed-through voltage may be performed.

Based on the data DATA, it may be possible for the clamp voltage adjustment circuit 22 to easily adjust the clamp voltage $V_{CLP}$ of the output signal $V_{GHM}$, and the adjustment of the feed-through voltage can be performed.

Since the output signal $V_{GHM}$ is output via an output buffer 28, an output capacitor for controlling the output signal $V_{GHM}$ may not be necessary. Therefore, even a gate driver of a liquid crystal panel that has a large screen in which the length of scanning lines is increased may be driven.

By adjusting the data DATA in synchronization with the selection of the scanning lines 13, it may be possible to adjust the feed-through voltage for each of the scanning lines 13 (second embodiment).

Figure 8:
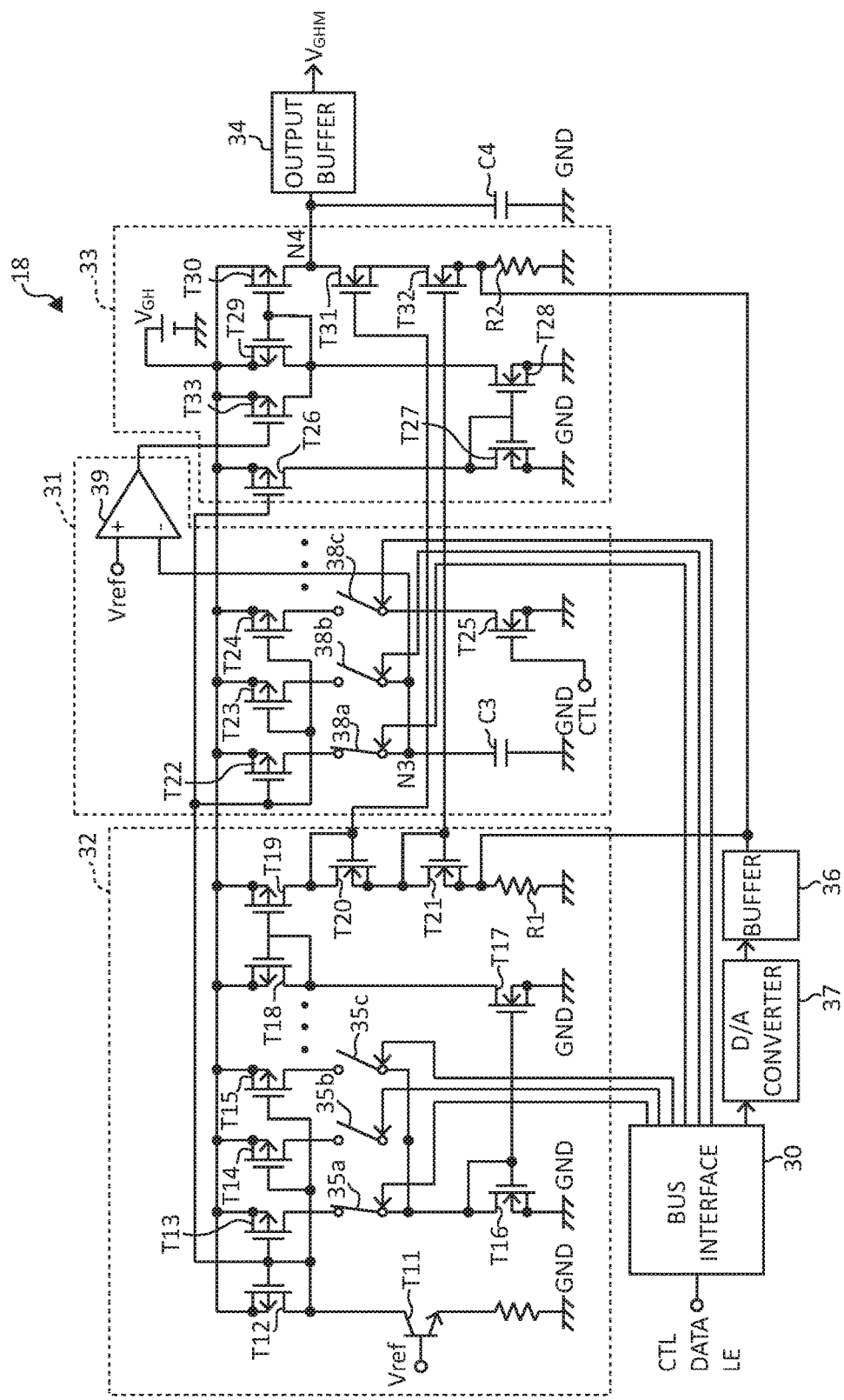
FIG. 8 illustrates a second embodiment of a voltage adjustment circuit of FIG. 2.

FIG. 8 illustrates a second embodiment of the voltage adjustment circuit. This embodiment is configured in such a manner that the clamp voltage $V_{CLP}$ of the output signal $V_{GHM}$ is analog-controlled based on the data DATA, so that the slope of the fall and the delay time period are digitally controlled.

The voltage adjustment circuit 18 of the present embodiment includes a bus interface 30, a delay setting circuit 31, a slope adjustment circuit 32, a clamp voltage adjustment circuit 33, and an output buffer 34.

A control signal CTL, data DATA, and an integrating signal LE for integrating the data DATA are input to the bus interface 30. The data DATA is input in such a manner as for the delay time period t1 of the output voltage $V_{GHM}$, the slope of the fall, and the clamp voltage $V_{CLP}$ to be in the form of digital signals of multiple bits.

In the slope adjustment circuit 32, a reference voltage Vref is input to the gate of an NPN transistor T11, and specific collector electrical current flows through the transistor T11. The reference voltage Vref is supplied from the outside. Alternatively, the reference voltage Vref may be generated within the voltage adjustment circuit 18.

The emitter of the transistor T11 is coupled to the ground GND via a resistor, the collector thereof is coupled to the drain and the gate of a P-channel MOS transistor T12, and the source of the transistor T12 is coupled to a power supply $V_{GH}$.

Furthermore, the gate of the transistor T12 is coupled to the gates of P-channel MOS transistors (electrical current adjustment circuits) T13 to T15, and a high-potential-side voltage $V_{GH}$ is supplied to the source of each of the transistors T13 to T15. Therefore, the transistors T13 to T15 perform a current mirror operation with respect to the transistor T12.

The drains of the transistors T13 to T15 are coupled to the drains and the gate of the N-channel MOS transistor T16 via switch circuits 35a to 35c, respectively, and the source of the transistor T16 is coupled to the ground GND.

The opening/closing of the switch circuits 35a to 35c is controlled based on a control signal supplied from the bus interface 30, and the control signal is generated based on the data DATA.

Therefore, under the control of the switch circuits 35a to 35c, the drain current flowing from the transistors T13 to T15 to the transistor T16 is adjusted, thereby adjusting the gate voltage of the transistor T16.

The gate of the transistor T16 is coupled to the gate of an N-channel MOS transistor T17, and the source of the transistor T17 is coupled to the ground GND. Then, the transistors T16 and T17 perform a current mirror operation.

The drain of the transistor T17 is coupled to the drain and the gate of the P-channel MOS transistor T18, and a high-potential-side voltage $V_{GH}$ is supplied to the source of the transistor T18.

Furthermore, the gate of the transistor T18 is coupled to the gate of a P-channel MOS transistor T19, and a high-potential-side voltage $V_{GH}$ is supplied to the source of the transistor T19. Therefore, the transistors T18 and T19 perform a current mirror operation.

The drain of the transistor T19 is coupled to the drain and the gate of an N-channel MOS transistor T20, and the source of the transistor T20 is coupled to the drain and the gate of an N-channel MOS transistor T21. Then, the source of the transistor T21 is coupled to the ground GND via a resistor R1.

Therefore, as the drain current of the transistor T19 increases, the gate voltage of the transistors T20 and T21 increases, and as the drain current of the transistor T19 decreases, the gate voltage of the transistors T20 and T21 decreases (current-to-voltage converter).

The output voltage of a buffer 36 is supplied to the source of the transistor T21. Regarding the output voltage, data for setting the clamp voltage $V_{CLP}$ within the data DATA that is input to the bus interface 30 is converted into an analog voltage by the D/A converter 37, and the analog voltage is supplied via the buffer 36.

Then, when the output voltage of the buffer 36 increases based on the data DATA, the gate voltages of the transistors T20 and T21 increase.

The gate of the transistor T12 is coupled to the gates of P-channel MOS transistors T22 to T24, and the high-potential-side voltage $V_{GH}$ is supplied to the sources of the transistors T22 to T24.

The drains of the transistors 122 to T24 are coupled to a node N3 that is one end of a capacitor C3 via switch circuits 38a to 38c, respectively, and the other end of the capacitor C3 is coupled to the ground GND.

Based on the data DATA, the opening/closing of the switch circuits 38a to 38c is controlled in accordance with a control signal output from the bus interface 30. Then, the drain currents of the transistors T22 to T24 are supplied to the capacitor C3 via the switch circuits 38a to 38c that are controlled in a conductive state, respectively, causing the capacitor C3 to be charged (electrical current adjustment circuit).

Therefore, when the transistors T22 to T24 are turned on, by controlling the switch circuits 38a to 38c, it may be possible to control the rate of increase of the potential of the node N3.

The node N3 is coupled to the drain of an N-channel MOS transistor T25, the control signal CTL is input to the gate of the transistor T25, and the source thereof is coupled to the ground GND.

The size of the transistor T25 is formed sufficiently larger than the size of the transistors T22 to T24, for example.

When the transistor T25 is turned on in accordance with the control signal CTL, the charging electric charge of the capacitor C3 is absorbed, and the node N3 is decreased to nearly the ground GND level.

The node N3 is coupled to the minus-side input terminal of a comparator 39, and a reference voltage Vref is supplied to the plus-side input terminal of the comparator 39. Therefore, when the potential of the node N3 equals to or is lower than the reference voltage, the output signal of the comparator 39 shifts to an H level, and when the potential of the node N3 equals to or is higher than the reference voltage, the output signal of the comparator 39 shifts to an L level.

The gate of the transistor T12 is coupled to the gate of a P-channel MOS transistor T26, a high-potential-side voltage $V_{GH}$ is supplied to the source of the transistor T26, and the transistors T12 and T26 perform a current mirror operation. The drain of the transistor T26 is coupled to the drain and the source of an N-channel MOS transistor T27, and the source of the transistor T27 is coupled to the ground GND.

Furthermore, the gate of the transistor T27 is coupled to the gate of an N-channel MOS transistor T28, and the source of the transistor T28 is coupled to the ground GND. Therefore, the transistors T27 and T28 perform a current mirror operation. When the transistor T26 is turned on, a similar drain current flows through the transistors T27 and T28.

The drain of the transistor T28 is coupled to the drain and the gate of a P-channel MOS transistor T29, and a high-potential-side voltage $V_{GH}$ is supplied to the source of the transistor T29.

The gate of the transistor T29 is coupled to the gate of a P-channel MOS transistor T30, and a high-potential-side voltage $V_{GH}$ is supplied to the source of the transistor T30. The transistors T29 and T30 perform a current mirror operation.

The drain of the transistor T30 is coupled to the ground GND via N-channel MOS transistors T31 and T32 and the resistor R2 (output circuit). The gate of the transistor T31 is coupled to the gate of the transistor T20, and the gate of a transistor T32 is coupled to the gate of the transistor T21.

The size of the transistor T30 is formed sufficiently larger than the size of the transistors T31 and T32.

A capacitor C4 is coupled between a node N4 that is the drain of the transistors T30 and T31 and the ground GND, and the potential of the node N4 is output as an output voltage $V_{GHM}$ via the output buffer 34.

A P-channel MOS transistor T33 is coupled in parallel between the source and the drain of the transistor T29, and an output signal of the comparator 39 is input to the gate of the transistor T33.

Next, a description is given of the operation of the voltage adjustment circuit 18 configured in the above-described manner. When the reference voltage Vref is supplied, the transistors T12 to T15, T22 to T24, and T26 are turned on.

Then, the transistors T27 and T28 are turned on in accordance with the drain current of the transistor T26.

If the control signal CTL is at an H level, the transistor T25 is turned on, the node N3 shifts to the ground GND level, and the output signal of the comparator 39 shifts to an H level, thereby turning off the transistor T33.

In this state, the transistors T29 and T30 are turned on in response to the ON operation of the transistor T28, the capacitor C4 is charged, the node N4 increases to the high-potential-side voltage $V_{GH}$ level, and the output signal $V_{GHM}$ shifts to a $V_{GH}$ level.

On the other hand, when the control signal CTL shifts to an L level, the transistor T25 is turned off. Then, the capacitor C3 is charged with the drain current of at least one of the transistors T22 to T24 that are selected by the switch circuits 38a to 38c, thereby causing the potential of the node N3 to be increased.

When the potential of the node N3 increases and equals to or becomes higher than the reference voltage Vref, the output signal of the comparator 39 shifts to an L level, and the transistor T33 is turned on. Then, the transistors T29 and T30 are turned off, and the output signal $V_{GHM}$ starts to decrease in response to the ON operation of the transistors T31 and T32.

Therefore, as illustrated in FIG. 3, the output signal $V_{GHM}$ starts to decrease after a passage of the delay time period t1 after the control signal CTL decreases to an L level. This delay time period t1 may be adjusted at three levels by the switch circuits 38a to 38c whose opening/closing is controlled based on the data DATA.

The rate of increase, that is, the slope of the output signal $V_{GHM}$, may be adjusted at three levels by controlling the switches 35a to 35c based on the data DATA. That is, by controlling the switch circuits 35a to 35c in order to adjust the drain current of the transistor T16, the drain current of the transistors T17, T18, and T19 is adjusted.

When the drain current of the transistor T19 is adjusted, the gate voltage of the transistors T20 and T21 is adjusted, and at a similar time, the gate voltage of the transistors T31 and T32 is adjusted. Then, the drain current of the transistors T31 and T32 is adjusted, and the slope of the decrease in the output signal $V_{GHM}$ is adjusted.

The output signal $V_{GHM}$ decreases to the clamp voltage $V_{CLP}$, and thereafter is maintained at the clamp voltage $V_{CLP}$. This clamp voltage $V_{CLP}$ is set based on the output voltage of the buffer 36 that is adjusted based on the data DATA.

In the voltage adjustment circuit configured in the above-described manner, it may be possible to obtain operational effects similar to those of the first embodiment by using the delay setting circuit 31, the slope adjustment circuit 32, and the clamp voltage adjustment circuit 33. Also, operational effects described below may be obtained. No capacitor is used in the slope adjustment circuit 32, and the slope of the decrease in the output signal $V_{GHM}$ is adjusted by the electrical current voltage conversion operation by the current mirror circuit. As a result, the adjustment accuracy may be improved when compared to the first embodiment.

Figure 9:
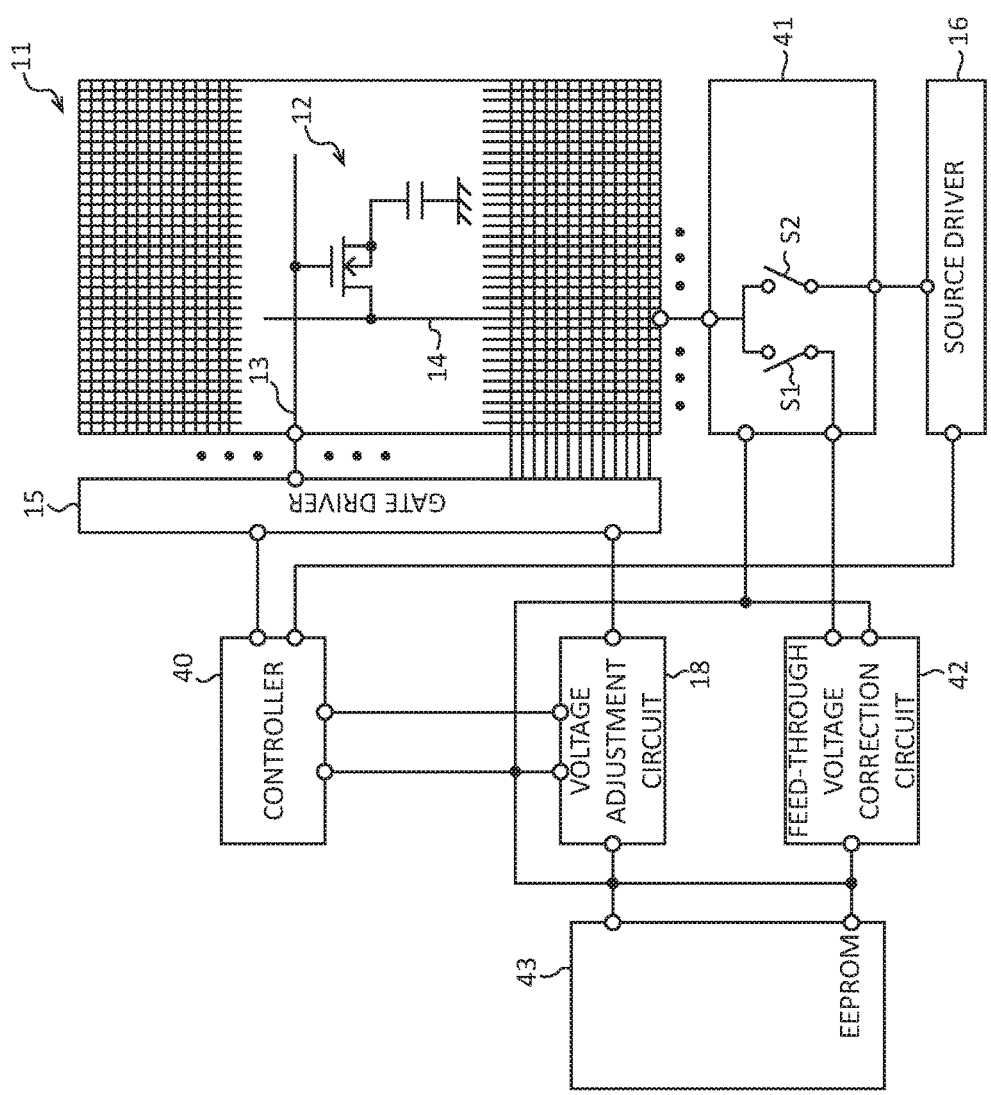
FIG. 9 illustrates a third embodiment.
Figure 10:
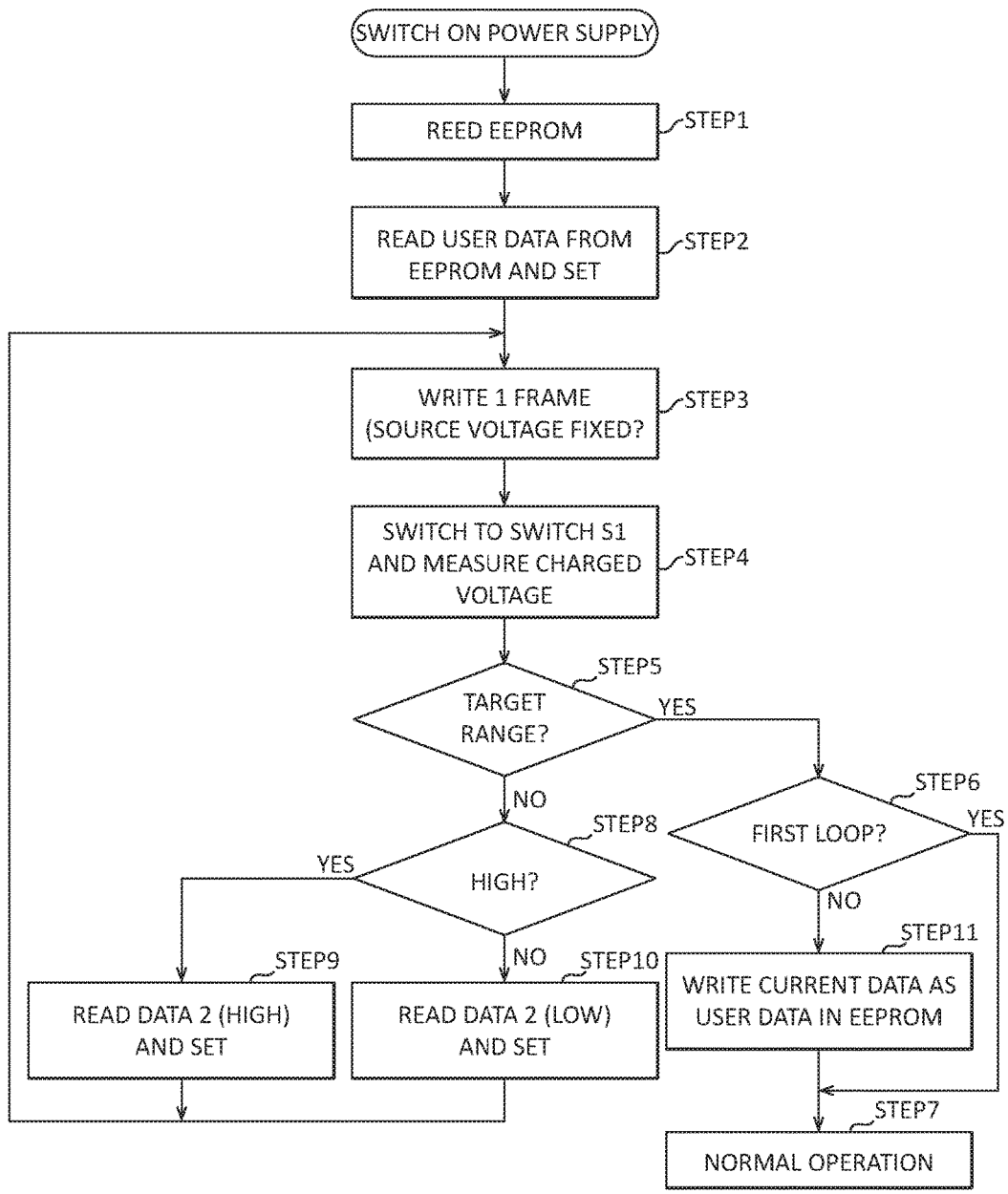
FIG. 10 illustrates a flowchart illustrating an operation of the third embodiment of FIG. 9.

FIGS. 9 and 10 illustrate a third embodiment. The present embodiment is provided with a feed-through voltage correction circuit (data adjustment circuit) 42 that selects, from a preset table, data DATA to be input to a voltage adjustment circuit and that automatically adjusts the feed-through voltage within a target range. Components of the third embodiment, which are identical to those of the first and second embodiments, are designated with the same reference numerals, and detailed descriptions thereof are omitted.

A switch circuit 41 is provided between the liquid crystal panel 11 and the source driver 16. In this switch circuit 41, a pair of switch circuits S1 and S2 are coupled to each of input signal lines 14, the switch circuit S1 is coupled to a feed-through voltage correction circuit 42, and the switch circuit S2 is coupled to the source driver 16. Then, the opening/closing of each of the switch circuits S1 and S2 is controlled by the feed-through voltage correction circuit 42.

An EEPROM 43 is coupled to the feed-through voltage correction circuit 42. The feed-through voltage correction circuit 42 outputs user data read from the EEPROM 43 to the voltage adjustment circuit 18.

The controller 40 is prestored with data DATA as a table for adjusting the output signal $V_{GHM}$ of the voltage adjustment circuit 18, and outputs data DATA selected based on a communication signal output from the feed-through voltage correction circuit 42 to the voltage adjustment circuit 18. Furthermore, similarly to the first embodiment, the control signal CTL is output to the gate driver 15, the source driver 16, and the voltage adjustment circuit 18.

The feed-through voltage correction circuit 42 operates in accordance with a preset program, and adjusts the data DATA to be supplied to the voltage adjustment circuit 18 so that, for example, the feed-through voltage falls within a desired range when the power supply is switched on. A description is given below, with reference to FIG. 10, of the operation of the feed-through voltage correction circuit 42.

When the power supply is switched on, the feed-through voltage correction circuit 42 reads current user data (or initial value) stored in the EEPROM 43, and outputs the user data as data DATA to the voltage adjustment circuit 18 (steps 1 and 2).

Next, by placing the switch circuit S2 in a conductive state, a writing operation is performed with a charged voltage VS1 on all the pixel circuits 12 of the liquid crystal panel 11, and then a holding operation is performed (step 3). Then, by placing the switch circuit S2 in a non-conductive state and placing the switch circuit S1 in a conductive state, the charged voltage VS2 of all the pixel circuits 12 is read into the feed-through voltage correction circuit 42 (step 4).

In the feed-through voltage correction circuit (determination circuit) 42, it is determined whether or not the difference voltage between the written charged voltage VS1 and the charged voltage VS2 of all the pixel circuits 12, that is, the feed-through voltage of each pixel circuit 12, falls within a target range (step 5).

Then, if the difference voltage is within the target range, the process proceeds to step 6. In the case of a first measurement of the feed-through voltage, the feed-through voltage falls within the target range with the use of the with the current data DATA. Thus, the switch circuit S1 is placed in a non-conductive state, the switch circuit S2 is placed in a conductive state, and the process proceeds to a normal operation (step 7).

When it is determined in step 5 that the feed-through voltage equals to or is higher than the target range, the data DATA for adjusting the slope of the decrease in the output signal $V_{GHM}$ and the clamp voltage $V_{CLP}$, that is, the data DATA for setting in a direction in which the feed-through voltage is decreased, is read from the controller (data selection circuit) 40. Then, the data DATA is input to the voltage adjustment circuit 18 (steps 8 and 9), and the process proceeds to step 3.

Next, the switch circuit S2 is placed in a conductive state once more, and a writing operation and a holding operation are performed with a similarly charged voltage VS1 on all the pixel circuits 12 of the liquid crystal panel 11, and by placing the switch circuit S1 in a conductive state, the charged voltage VS2 of each pixel circuit 12 is read to the feed-through voltage correction circuit 42 (step 4). Then, it is determined once more in step 5 whether or not the feed-through voltage of each pixel circuit 12 falls within the target range.

When it is determined in step 5 that the feed-through voltage equals to or is lower than the target range, data DATA for adjusting the slope of the decrease in the output signal $V_{GHM}$ and the clamp voltage $V_{CLP}$, that is, data DATA for setting the feed-through voltage in a direction in which the feed-through voltage increases, is read from the controller 40. Then, the data DATA is input to the voltage adjustment circuit 18 (steps 8 and 10), and the process proceeds to step 3.

Next, by placing the switch circuit S2 once more in a conductive state, a writing operation and a holding operation are performed with the similarly charged voltage VS1 on all the pixel circuits 12 of the liquid crystal panel 11. By placing the switch circuit S1 in a conductive state, the charged voltage VS2 of each pixel circuit 12 is read into the feed-through voltage correction circuit 42 (step 4). Then, it is determined once more whether or not the feed-through voltage of each pixel circuit 12 falls within the target range.

After such operations are repeated, when it is determined in step 5 that the feed-through voltage falls within the target range, the process proceeds from step 6 to step 11, where the current data DATA is written as user data in the EEPROM 43. The process proceeds to a normal state in which the user data is supplied as data DATA to the voltage adjustment circuit 18 (step 11).

In the present embodiment, operational effects described below may be obtained.

The feed-through voltage of each pixel circuit 12 of the liquid crystal panel 11 may be automatically made to fall within the preset target range.

When the controller 17 of the liquid crystal panel 11 is started up, the adjustment of the feed-through voltage is performed. After the feed-through voltage is made to fall within the target range, the process may automatically proceed to a normal operation (fourth embodiment).

Figure 11:
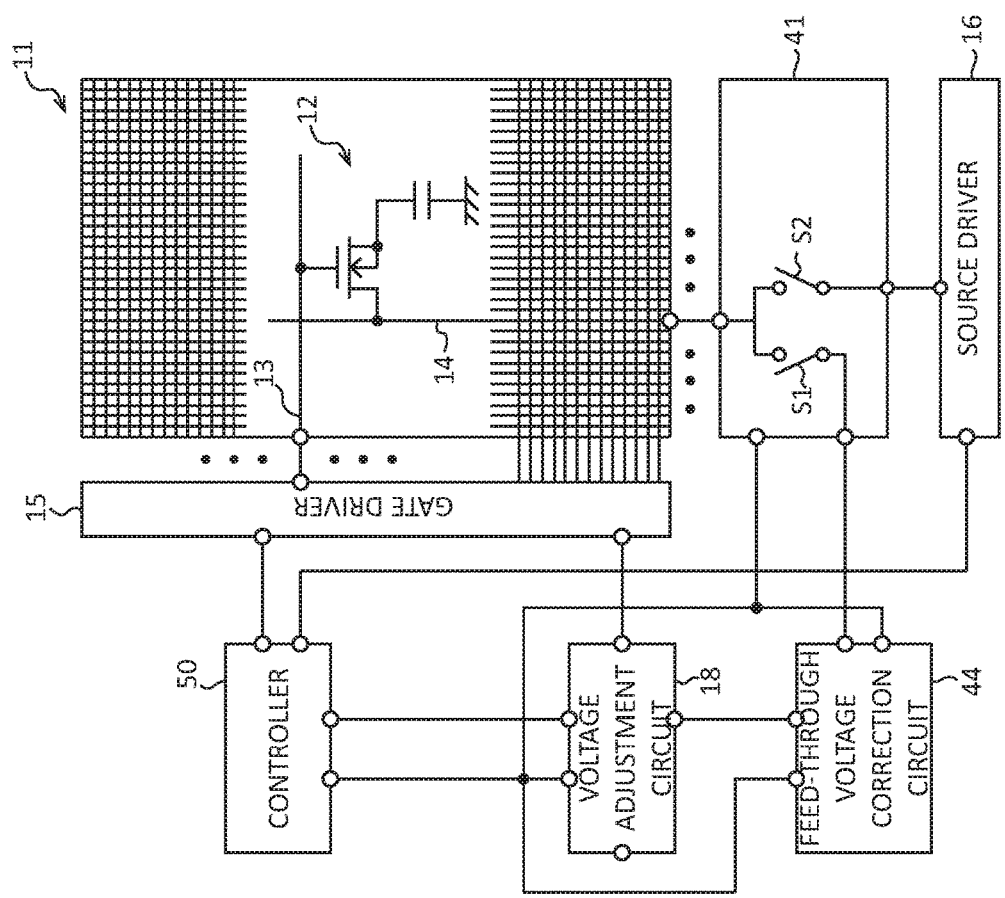
FIG. 11 illustrates a fourth embodiment.
Figure 12:
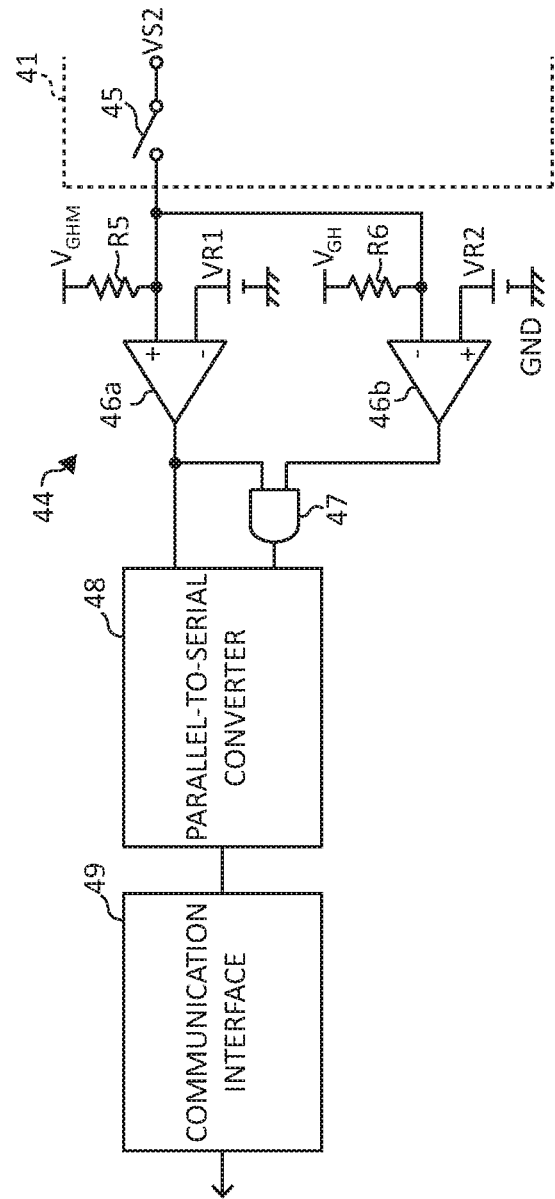
FIG. 12 illustrates a feed-through voltage adjustment circuit of the fourth embodiment of FIG. 11.
Figure 13:
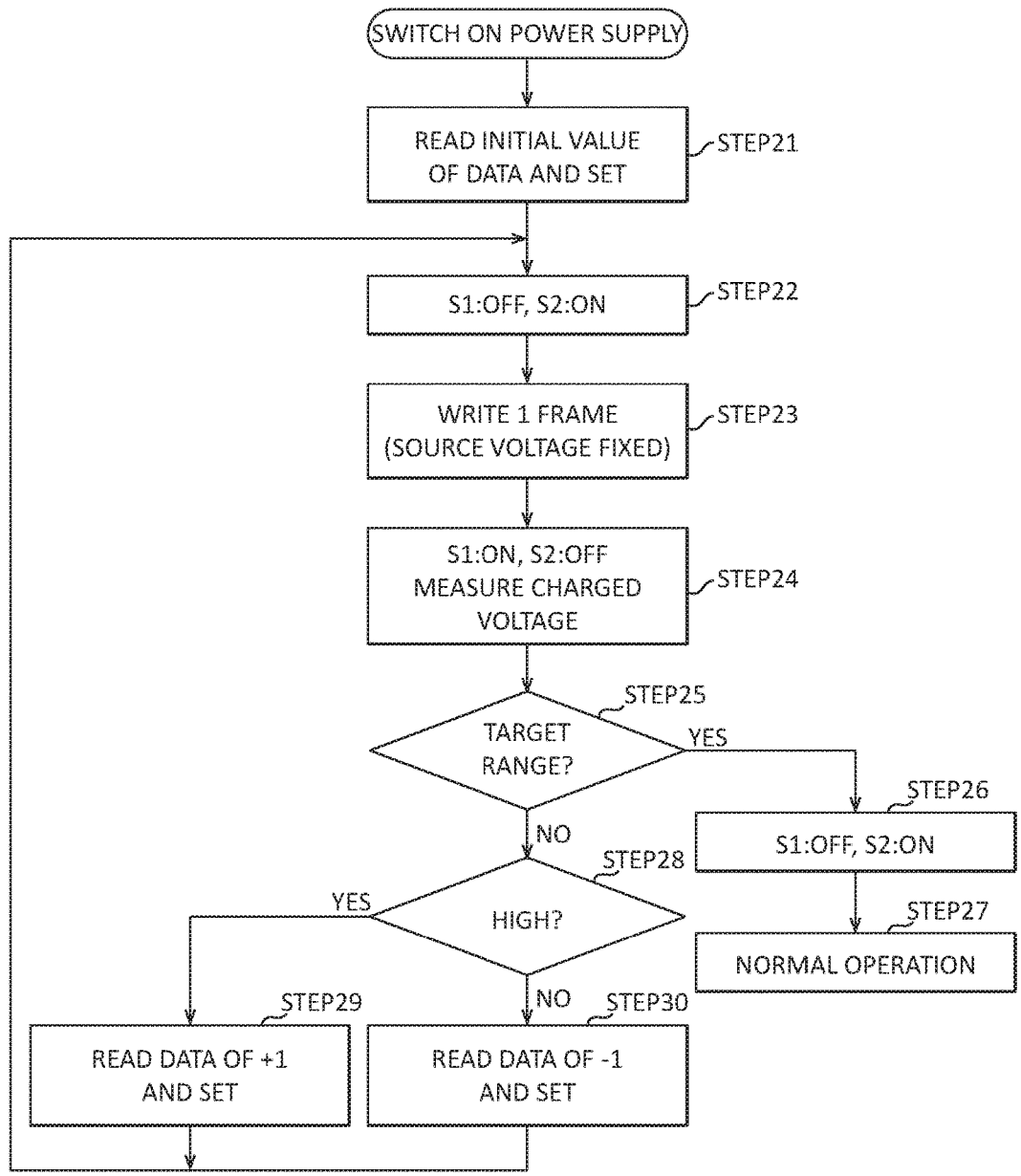
FIG. 13 illustrates a flowchart illustrating an operation of the fourth embodiment of FIG. 11.

FIGS. 11 to 13 illustrate a fourth embodiment. The present embodiment, similarly to the third embodiment, is provided with a controller 50 and a feed-through voltage correction circuit 44, which select, from a preset table, data DATA to be input to the voltage adjustment circuit and automatically adjust the feed-through voltage in order to fall within the target range. Components of the fourth embodiment, which are identical to the components of the third embodiment, are designated with the same reference numerals.

A switch circuit 41 is provided between the liquid crystal panel 11 and the source driver 16, a pair of switch circuits S1 and S2 are coupled to each input signal line 14, the switch circuit S1 is coupled to the feed-through voltage correction circuit 44, and the switch circuit S2 is coupled to the source driver 16. Then, the opening/closing of the switch circuits S1 and S2 is controlled by the feed-through voltage correction circuit 44.

The controller 50 is prestored with data DATA as a table, the data being used to adjust the output signal $V_{GHM}$ of the voltage adjustment circuit 18. Furthermore, the controller 50 outputs a control signal CTL to the gate driver 15, the source driver 16, and the voltage adjustment circuit 18.

The controller 50 operates in accordance with a preset program, and adjusts the data DATA to be supplied to the voltage adjustment circuit 18 so that, for example, the feed-through voltage falls within a certain range when the power supply is switched on.

A specific configuration of the feed-through voltage correction circuit 44 is described with reference to FIG. 12. The charged voltage VS2 of each pixel circuit 12 is input from the switch circuit 41 via a switch circuit 45. The switch circuit 45 is controlled in a conductive state during the feed-through voltage adjustment operation when the power supply is switched on.

The charged voltage VS2 is input to the plus-side input terminal of a comparator 46a, and a reference voltage VR1 is input to the minus-side input terminal of the comparator 46a. Furthermore, the plus-side input terminal is coupled to the power supply $V_{GH}$ via a resistor R5 that has a high resistance. Therefore, when the charged voltage VS2 decreases to less than the reference voltage VR1, the output signal of the comparator 46a shifts to an L level.

Furthermore, the charged voltage VS2 is input to the minus-side input terminal of a comparator 46b, and the reference voltage VS2 is input to the plus-side input terminal of the comparator 46b. The minus-side input terminal is coupled to the power supply $V_{GH}$ via a resistor R6 that has a high resistance. Therefore, when the charged voltage VS2 increases to more than the reference voltage VR2, the output signal of the comparator 46a shifts to an L level.

The reference voltage VR2 is set to a voltage higher than the reference voltage VR1, the reference voltage VR1 is set to a lower limit value of the charged voltage VS2, and the reference voltage VR2 is set to an upper limit value of the charged voltage VS2. Therefore, when the charged voltage VS2 equals to or becomes lower than or equal to the reference voltage VR1, the output signal of the comparator 46a shifts to an L level, and the output signal of the comparator 46b shifts to an H level.

Furthermore, when the charged voltage VS2 satisfies VR1<VS2<VR2, both the output signals of the comparators 46a and 46b shift to an H level. When the charged voltage VS2 exceeds the reference voltage VR2, the output signal of the comparator 46a shifts to an H level, and the output signal of the comparator 46b shifts to an L level. Then, the reference voltages VR1 and VR2 are set so that, when VR1<VS2<VR2, the feed-through voltage of each pixel circuit 12 falls within a permissible range.

The output signal of the comparator 46a is input to a parallel-to-serial converter 48, and the output signals of the comparator 46a and 46b are input to an AND circuit 47. The output signal of the AND circuit 47 shifts to an H level when the charged voltage VS2 satisfies VR1<VS2<VR2.

Therefore, when the charged voltage VS2 satisfies VS2<VR1, both the 2-bit output signals of the comparator 46a and the AND circuit 47 shift to an L level. When the charged voltage VS2 satisfies VR1<VS2<VR2, the 2-bit output signals of the comparator 46a and the AND circuit 47 shift to an H level. Furthermore, when the charged voltage VS2 satisfies VR2<VS2, the output signal of the comparator 46a shifts to an H level, and the output signal of the AND circuit 47 shifts to an L level. With such a configuration, the three kinds of states of the charged voltage VS2 are converted into a 2-bit signal and are input to the parallel-to-serial converter 48.

The parallel-to-serial converter 48 converts the 2-bit parallel signals output from the comparator 46a and the AND circuit 47 into serial signals, and outputs the signals to the communication interface 49. The communication interface 49 outputs the serial signals to the controller 50.

Next, a description is given, with reference to FIG. 13, of the operation of the feed-through voltage correction circuit 44 and the controller 50.

When the power supply is switched on, the controller 50 reads an initial value from the table of the data DATA, and outputs the initial value as data DATA to the voltage adjustment circuit 18 (step 21).

Next, the switch circuit S1 is placed in a non-conductive state and the switch circuit S2 is placed in a conductive state, a writing operation is performed with the similarly charged voltage VS1 on all the pixel circuits 12 of the liquid crystal panel 11, and then a holding operation is performed (steps 22 and 23). Then, in a state in which the switch circuit S2 is placed in a non-conductive state, and the switch circuit S1 is placed in a conductive state, for example, the charged voltages VS2 of the pixel circuits 12 coupled to both ends of one scanning line 13 and to an intermediate section between both ends thereof are sequentially read into the feed-through voltage correction circuit 44 (step 24).

In the feed-through voltage correction circuit 44, the read charged voltage VS2 is compared in sequence with the reference voltages VR1 and VR2, and the comparison results are output in the form of a serial signal to the controller 50.

The controller 50 determines whether or not all the input comparison results are within the target range, that is, VR1<VS2<VR2 (step 25). Then, in a case where all the comparison results satisfy VR1<VS2<VR2, the switch circuit S2 is made to conduct, the switch circuit S1 is made to not conduct, and the process proceeds to a normal operation (steps 26 and 27).

When it is determined in step 25 that the charged voltage VS2 equals to or is lower than the reference voltage VR1, the feed-through voltage equals to or is higher than the target range. The data DATA is shifted by one level so that the feed-through voltage of the output signal $V_{GHM}$ of the voltage adjustment circuit 18 is decreased (steps 28 and 29), and the process returns to step 22.

Next, steps 22 to 25 are repeated. When the feed-through voltage reaches the target range, the process proceeds to step 26.

When it is determined in step 25 that the charged voltage VS2 equals to or is higher than the reference voltage VR2, the feed-through voltage equals to or is lower than the target range. Therefore, the data DATA is shifted by one level so that the slope of the decrease in the output signal $V_{GHM}$ of the voltage adjustment circuit 18 becomes steep (steps 28 and 30), and the process returns to step 22.

Next, steps 22 to 25 are repeated. When the feed-through voltage reaches the target range, the process proceeds to step 26.

In the present embodiment, operational effects described below may be obtained.

The feed-through voltage of each of the pixel circuits 12 of the liquidcrystal panel 11 may be automatically made to fall within a preset target range.

When the controller 50 of the liquid crystal panel 11 is to be started up, the adjustment of the feed-through voltage is performed, and after the feed-through voltage is made to fall within the target range, it may be possible to automatically proceed to a normal operation.

The above-described embodiments may be carried out in the modes described below. In the first and second embodiments, in order to adjust the feed-through voltage, a voltage adjustment circuit including at least a slope adjustment circuit and a clamp voltage adjustment circuit may be used.

According to the above-discussed embodiments, even if an externally provided element is not used, the feed-through voltage of the display device is adjusted.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the aspects of the invention and the concepts contributed by the inventor to furthering the art, and are to be construed as being without limitation to such specifically recited examples and conditions, nor does the organization of such examples in the specification relate to a illustrating of the superiority and inferiority of the aspects of the invention. Although the embodiments in accordance with aspects of the present invention have been described in detail, it should be understood that various changes, substitutions, and alterations could be made hereto without departing from the spirit and scope of the invention.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A voltage adjustment circuit for adjusting a voltage to be supplied to scanning lines of a display device, the voltage adjustment circuit comprising:
    a clamp voltage adjustment circuit configured to adjust a clamp voltage value at which the voltage is clamped when the voltage decreases in response to a decrease in a control signal, wherein the voltage decreases to the clamp voltage according to a slope of a decrease, wherein the clamp voltage value is adjustable based on data that is externally input, and wherein the data is in a form of digital signals of multiple bits; and
    a slope adjustment circuit configured to adjust the slope of the decrease in the voltage based on the data that is externally input; wherein the slope adjustment circuit comprises:
        a current adjustment circuit configured to adjust a current value based on the data;
        a current-to-voltage converter configured to convert a current value of the current adjustment circuit into a voltage value; and
        an output circuit configured to output a charged voltage of a first capacitor as the voltage and to absorb the charged electric charge of the first capacitor in order to decrease the charged voltage based on the output voltage of the current-to-voltage converter.

2. The voltage adjustment circuit of claim 1, comprising:
    a delay setting circuit configured to seat a time period until the decrease in the voltage starts based on the data; wherein the delay setting circuit comprises:
        a second capacitor;
        a current adjustment circuit configured to adjust the charged electric current of the second capacitor based on the data;
        a comparator configured to compare the charged voltage of the second capacitor with a reference voltage; and
        an output circuit configured to cause a discharge of the first capacitor to be started by using an output of the comparator as a trigger.

3. A voltage adjustment circuit for adjusting a voltage to be supplied to scanning lines of a display device, the voltage adjustment circuit comprising:
    a slope adjustment circuit configured to adjust a slope of a decrease in the voltage based on data that is externally input, wherein the data is in a form of digital signals of multiple bits; and
    a clamp voltage adjustment circuit configured to adjust a clamp voltage value at which the voltage is clamped when the voltage decreases in response to a decrease in a control signal, wherein the voltage decreases to the clamp voltage according to the slope of the decrease, wherein the clamp voltage value is adjustable based on the data that is externally input, and wherein the clamp voltage adjustment circuit comprises:
        a D/A converter configured to convert the data into an analog voltage; and
        an output circuit configured to set a voltage value at which the voltage is clamped based on a supply of the analog voltage.

4. A display device comprising:
    scanning lines;
    a gate driver configured to drive the scanning lines;
    a data adjustment circuit configured to adjust the data so that a charged voltage of a capacitor of each of pixel circuits of the display device falls within a target range; and
    a voltage adjustment circuit configured to adjust a voltage to be supplied to the gate driver; wherein the voltage adjustment circuit comprises:
        a slope adjustment circuit configured to adjust a slope of a decrease in the voltage based on data that is externally input, wherein the data is in a form of digital signals of multiple bits; and
        a clamp voltage adjustment circuit configured to adjust a clamp voltage value at which the voltage is clamped when the voltage decreases in response to a decrease in a control signal, wherein the voltage decreases to the clamp voltage according to the slope of the decrease, and wherein the clamp voltage value is adjustable based on the data that is externally input.

5. The display device according to claim 4, wherein the data adjustment circuit comprises:
    a determination circuit configured to determine whether or not a charged voltage of each of the pixel circuits is within the target range; and
    a data selection circuit configured to select the data in which the charge voltage falls within the target range and supplies the data to the voltage adjustment circuit based on a determination result of the determination circuit; wherein the data selection circuit has a data table in which a plurality of items of the data are included.

6. The display device according to claim 5, wherein the data selection circuit has a data table in which a plurality of items of the data are included.

* * * * *